F. ELLICOTT.
MEANS FOR LUBRICATING ENGINE CYLINDERS.
APPLICATION FILED JULY 30, 1913.
1,103,354.
Patented July 14, 1914.
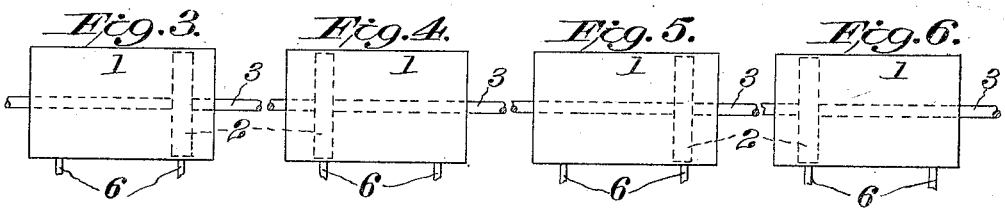
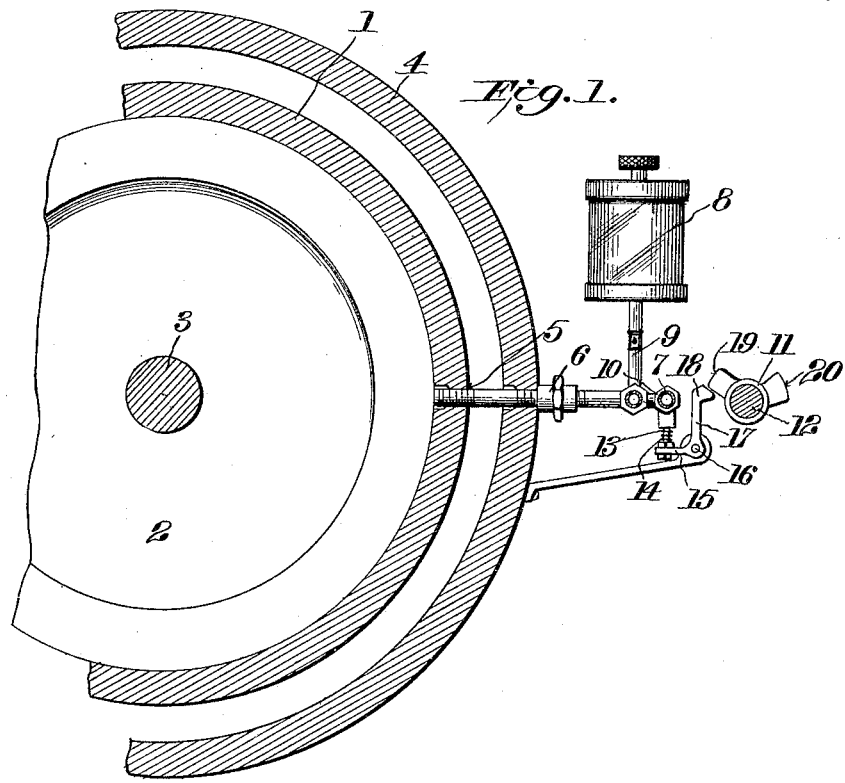
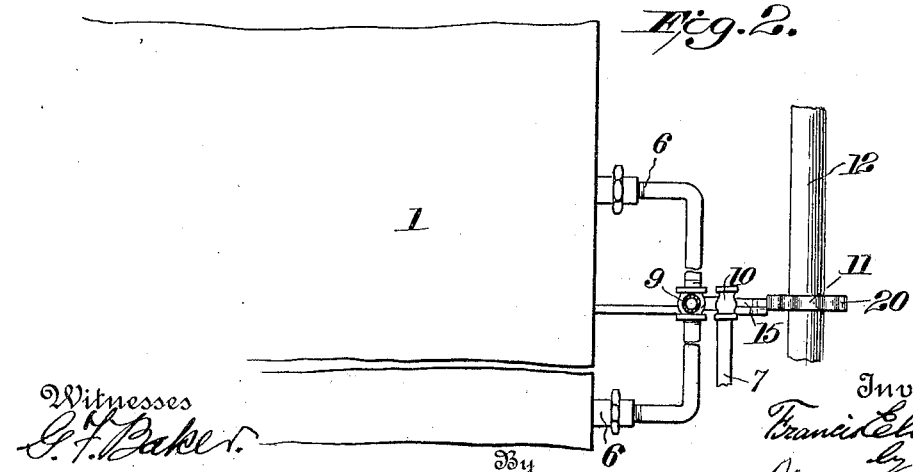

UNITED STATES PATENT OFFICE.

FRANCIS ELLICOTT, OF RUXTON, MARYLAND.

MEANS FOR LUBRICATING ENGINE-CYLINDERS.

1,103,354.  Specification of Letters Patent.  Patented July 14, 1914.

Application filed July 30, 1913.   Serial No. 782,007.

*To all whom it may concern:*

Be it known that I, FRANCIS ELLICOTT, a citizen of the United States of America, residing at Ruxton, Baltimore county, State of Maryland, have invented certain new and useful Improvements in Means for Lubricating Engine-Cylinders, of which the following is a specification.

This invention relates to means for lubricating the piston, piston rod and walls of the cylinder of an engine. The apparatus may be applied to any type of engine, but it is found particularly useful with internal combustion engines.

The method of operation consists in atomizing oil and injecting it into the cylinder so that it saturates the air or gas in the cylinder and is caused to condense on the cylinder walls and the piston rod, and likewise in lubricating the piston by introducing atomized lubricant into the slight annular space between the walls of the piston and the cylinder, so that the thin air film becomes saturated with oil, and all the surfaces within the cylinder which are subject to friction, are covered with an exceedingly thin but uniform deposit of lubricant.

In the practice of the invention periods for introducing lubricant are chosen and the quantity introduced is determined to give the desired result, but preferably the lubricant is introduced into the cylinder when the pressure therein is reduced to or below normal atmospheric pressure. For the purpose of applying the lubricant, a supply of air, gas or steam, all of which are included under the term gas used broadly, is maintained. This is under high pressure and the supply is connected to the cylinder at one or two points, preferably in line with the position of the piston near each end of its stroke. These connections terminate at its stroke. These connections terminate at and lead to the inner surface of the cylinder walls. Oil is fed to the pipe in quantities suitable for the lubrication and a valve is provided, actuated by any suitable means to release the compressed gas for successive short periods whereby a small quantity of oil is atomized and introduced into the cylinder at each period. A cam on a shaft driven at a speed bearing a fixed ratio to the speed of the engine may be used for this purpose. The cam is preferably provided with one or more operative portions of steep inclination so that the valve is opened and closed quickly at very short intervals during the operation of the engine, causing a temporary flow or jet of the confined gas whereby the lubricant is atomized and carried into the cylinder at high velocity. Oil thus forced into the cylinder or into the space between the piston and the cylinder walls condenses almost immediately upon all the exposed surfaces, giving the cylinder walls, the piston and the piston rod an exceedingly thin and uniform coating of lubricant and performing this at certain regular intervals. In this way lubrication is accomplished at a fraction of the expense and with a small portion of the oil incident to the operation of other systems as spray, gravity and splash feeds.

In the accompanying drawings I have illustrated in its preferred form an apparatus by means of which my invention may be practised.

Figure 1 is a cross-section taken through the cylinder at right angles to the axis, showing the lubricator, valve and cam. Fig. 2 is a fragmentary plan of the cylinder also showing the lubricating apparatus. Figs. 3, 4, 5 and 6 are diagrams showing the oil inlets and the piston in the various positions of the cylinder.

The invention is illustrated in connection with a double acting single cylinder gas engine, but it may be variously utilized in connection with steam or gas engines with single or multiple cylinders and of both the single and double acting type. However, it is particularly adapted for use in connection with internal combustion engines.

The engine as shown consists of a cylinder 1 in which reciprocates the usual piston 2 with the piston rod 3. The cylinder, as shown, is jacketed at 4 and pierced at 5 to receive oil jet tubes 6. These are preferably placed as shown in Fig. 3 at points in the path of the piston adjacent the ends of its stroke, so that points in the cycle may be chosen at which oil may be introduced through both pipes and enter simultaneously one into the piston space at low pressure and the other into the cylinder space surrounding the piston, lubricating the cylinder piston rod and piston simultaneously.

The oil jet tubes 6 are supplied with air, steam or other gas under pressure by way of the pipe 7, oil being fed to the pipe 7 in small quantities from any suitable source as the oil feed cup 8 connected to the pipe 7 by means of a tube 9. In the pipe 7 is a valve 10 controlled by a cam 11 on a rotating shaft 12. The valve 10 is maintained normally closed by means of a spring 13, and the stem 14 of the valve is connected to the horizontal arm of a bell crank lever 15 pivoted at 16 on the stationary bracket. The upright arm 17 of this lever carries a cam follower 18 which engages the cam 11. This follower engages the operative surfaces 19 and 20 of the cam and communicates the motion thereof to the valve, opening and closing it at the desired intervals.

By reference to Figs. 3, 4, 5 and 6 it will be noted that the inlets for the lubricant are in the path of the piston, substantially at each end of the stroke. According to the present scheme, lubrication takes place at the position of the engine illustrated in Figs. 4 and 5. In the first of these figures admission is taking place on the lefthand side of the piston and exhaust on the righthand. In this condition of the engine there is no pressure in the cylinder, and the resistance to the injection of the lubricant is much reduced. When the valve is opened, the gas under pressure with the oil which has entered the pipe, rushes into the engine cylinder, atomizing the oil and causing it to enter the cylinder in an atomized condition as a fine vapor. From the inlet on the right, the oil enters the cylinder space and is condensed on the cylinder walls and also on the surface of the piston rod. From the inlet on the left, the atomized lubricant enters the space between the cylinder walls and the piston, lubricating the cylindrical surfaces of the piston though the period of lubrication may extend beyond the period during which the oil passage is covered by the piston.

In Fig. 5 the piston has moved to the right so that in the cylinder space at the left of the piston, compression is about to take place and at the right admission is ready to begin. In this condition of the engine there is no pressure in the cylinder and lubrication takes place as in the above instance, the piston being lubricated through the inlet on the right and the cylinder walls by the atomized lubricant which enters through the inlet on the left. Two periods of lubrication are thus illustrated, but these periods may be chosen at will according to the preferred form of the invention; however, the oil is injected during the period of low pressure in the cylinder.

It is important to note that the periods of injection are exceedingly short, so that the entire blast of vapor extends over a small fraction of a second. In the particular instance shown this period amounts to about one tenth of a second and the piston travels during this time a total distance of six inches, about three inches in each direction.

By use of the apparatus herein described, the lubricant is atomized or vaporized and condensed on the surfaces to be lubricated, the lubricating vapor being introduced at intervals for short periods of time, and in small quantities sufficient to give the exposed surfaces within the cylinder a thin coat of lubricant of only the thickness required by the conditions to be met. In this way the greatest possible economy of lubrication is accomplished. The saving over the closely related systems by which the lubricant is sprayed and introduced in particles of considerable volume which strike the surfaces to be lubricated at points more or less widely separated causing deposits of lubricant to an unnecessary thickness, is exceedingly important and amounts to a large item.

I have thus described my invention specifically and in detail in order that it may be fully understood and the specific terms are used descriptively rather than in their limiting sense, the scope of the invention being defined in the claims:

I claim—

1. Means for lubricating the cylinder, piston and piston rod of an engine consisting in tubes opening into the cylinder in the path of the piston adjacent each end of its stroke, means for supplying gas under pressure to the tubes, means for feeding oil thereto, a valve controlling the supply of gas and a cam for opening the valve at intervals, the cam being timed to open the valve when the pressure in the cylinder is reduced and the piston is covering one oil inlet opening.

2. Means for lubricating the cylinder, piston and piston rod of an engine consisting of passages one opening into the cylinder in the path of the piston adjacent each end of its stroke, means for supplying gas under pressure to the passages, means for feeding oil thereto, means for controlling the supply of gas, and means for operating the same to release the gas at intervals when the pressure in the cylinder is reduced and the piston covers one inlet, said means having a positive relation to a moving member of the engine so that the relative timing of the operations of the engine and lubricator will not vary.

3. In an engine lubricator, means for supplying gas under pressure, a pipe leading therefrom to the cylinder at a point covered by the piston at the rear end of the stroke, means for introducing lubricant into the pipe, a valve in the pipe, and positive means connecting the valve to the engine to open the valve at predetermined periods during low pressure in the cylinder, one period including the time when the piston covers the oil pipe, the other being when the piston is near the opposite end of the stroke providing for the lubrication of the piston rod.

4. Means for lubricating engine cylinders which consists of means for supplying gas under pressure, a pipe leading therefrom to the cylinder, means for introducing lubricant into the pipe in the path of the gas, a valve in the pipe and means for opening the valve and closing it at intervals, said means being positively driven by the engine, the opening occurring when the pressure in the cylinder is reduced, when the piston covers the end of the pipe, and when the piston is at the opposite end of the stroke.

Signed by me at Baltimore State of Maryland this 29th day of July 1913.

FRANCIS ELLICOTT.

Witnesses:
　JENNIE FARSON,
　EDWIN F. SAMUELS.